Sept. 5, 1967      O. WANASELJA      3,340,431
OVER-VOLTAGE PROTECTION INSTRUMENT Filed June 27, 1966      4 Sheets-Sheet 1

INVENTOR.
OLEY WANASELJA
BY
MORGAN, FINNEGAN, DURHAM & PINE
ATTORNEYS

Sept. 5, 1967      O. WANASELJA      3,340,431
OVER-VOLTAGE PROTECTION INSTRUMENT Filed June 27, 1966      4 Sheets-Sheet 4

INVENTOR.
OLEY WANASELJA
BY
MORGAN, FINNEGAN, DURHAM & PINE
ATTORNEYS

United States Patent Office 3,340,431
Patented Sept. 5, 1967

3,340,431
OVER-VOLTAGE PROTECTION INSTRUMENT
Oley Wanaselja, 145 Noell St., Levittown, N.Y. 11756
Filed June 27, 1966, Ser. No. 560,464
6 Claims. (Cl. 317—9)

This application is a continuation-in-part of applicant's prior copending application Ser. No. 393,257, now Patent Number 3,281,625, filed Aug. 31, 1964, for Over-Voltage Protection Techniques, and assigned to the assignee of the instant application.

This invention relates to apparatus for protecting equipment from over-voltage conditions and is particularly directed to over-voltage sensitive devices for attachment to electrical conductors serving various types of apparatus, for example, communication equipment. In the illustrative application the protection device serves the purpose of protecting the equipment from the effects of excessive voltage such as might occur because of a fault, contact by high tension line, lightning and the like.

In applicant's aforementioned copending application, there is described an over-voltage protection instrument adapted for connection to electrical conductors which carry signals or power to electrical equipment. In the embodiment illustrated in said application, a housing is provided having terminals for connection across a pair of lines to be protected. A ground terminal is also provided and is returned to the ground or reference potential point.

Mounted within the housing is a ground connector and a pair of end connectors illustratively embodied as clips adapted to releasably receive an over-voltage discharge device in the form of a gaseous discharge tube. This tube, which is designed to ionize in the presence of an excessive voltage, is mounted in the ground clamp and end clips in such a manner as to create a low resistance path across the lines to ground in the event of an excessive voltage. Under these conditions, a form of short circuit is created which protects the equipment at the terminal ends of the lines from the adverse effects of such an over-voltage situation.

Mounted adjacent the over-voltage tube is an arrangement which supplements the protection afforded by the tube by producing an additional short-circuit path between the protected lines and ground in the even the tube should fail, e.g. by overheating. This feature is an important characteristic of the device since many users are reluctant to rely for the protection of expensive and sometimes critical equipment on the ability of the gaseous discharge tube to operate effectively in the presence of a sustained or unusually large over-voltage condition.

The supplementary shorting arrangement in the aforesaid application is embodied as a fusible element together with a shorting bridge and grounding system. The shorting bridge is urged towards a condition of contact with the clips holding the protective device, but under normal conditions, is separated therefrom with the aid of the fusible element. The force urging the bridge towards a condition of short-circuit contact across the lines is provided by a spring. The spring also exerts a force tending to displace the over-voltage tube and this is balanced by the ground clamp.

In the presence of a sustained or unusually large overload, the fusible element fuses whereupon the bridging element, under the action of the spring, is forced into electrical contact with the tube-holding clips thus short-circuiting and grounding them and the tube as well along with the lines connected thereto.

In the embodiments illustrated in the aforementioned application, the ground terminal or lug for grounding the casing is oriented to project through the top cover of the tube housing for supplying a point of connection to ground. However, in many applications, such a location insofar as the grounding terminal is concerned, is undesirable. Furthermore, it is frequently required by users that the cover of the over-voltage housing be secured in a manner which minimizes the possibility of tampering. In the embodiment listed in applicant's copending application, however, the cover is press-fitted into place and therefore may be removed without great difficulty.

It is an object of the present invention to provide an over-voltage protective instrument of the general type disclosed in the copending application, with provision, however, for a grounding terminal in the base of the instrument and with greater security in the cover fastening arrangement. In view of the requirement that the ground lug be placed in the base of the instrument, it is necessary to employ a supplementary shorting arrangement which differs in a number of respects from the corresponding arrangement in the copending application. For example, the presence of the grounding lug in the base of the instrument together with the location of the over-voltage tube adjacent the base, complicates the problem of providing supplementary shorting and grounding action in view of the lack of space. The present application is directed to overcoming this problem and to providing supplementary shorting and grounding action in a simple and reliable configuration in the region of the base of the housing. The application is also directed to improvements in the fusible element, in the element holding arrangement, in the shorting assembly and in the lead connection techniques. Other objects and advantages of the invention will be set forth in part hereinafter or will be obvious in the description below, or will become apparent by practice with the invention.

The invention consists in the novel parts, combinations, arrangements and improvements herein shown and described.

Serving to illustrate exemplary embodiments of the invention are the drawings of which:

The arrangement illustrated comprises a housing assembly 10 which includes a cover 11 and a base 12. The housing assembly is illustratively constructed of Bakelite, is adapted for sealing, and base 12 thereof includes mounting pads 14 and 15.

Figure 1:
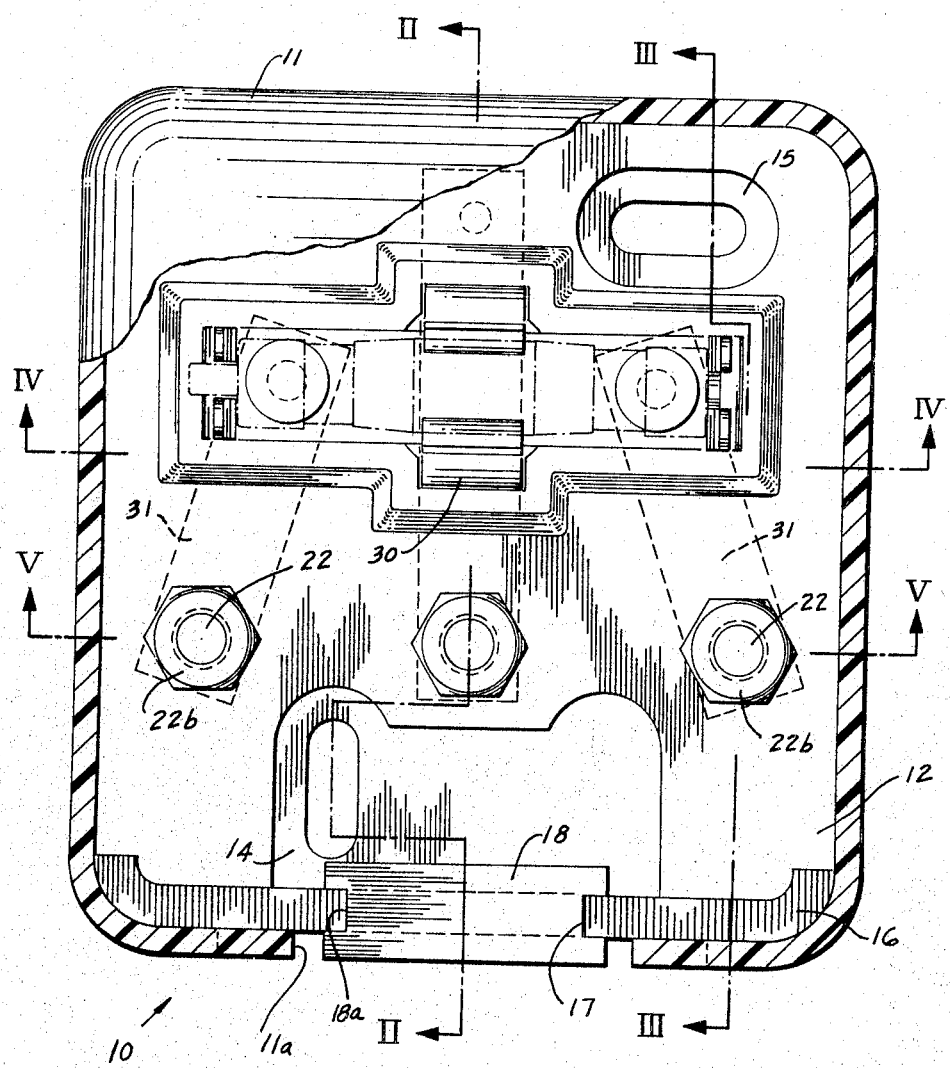
FIGURE 1 is a plan view partly in section of an over-voltage instrument according to the invention.
Figure 6:
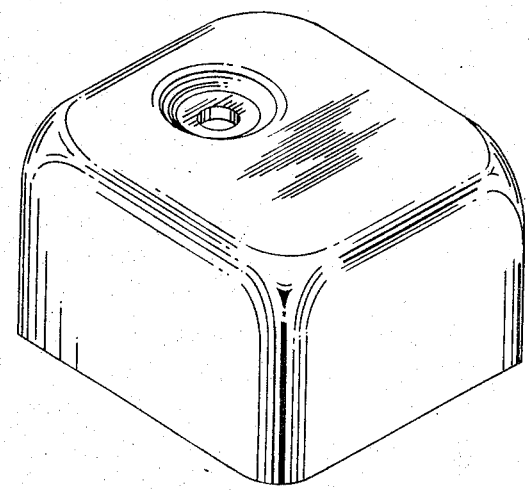
FIGURE 6 is an exploded isometric view of the embodiment of FIGURE 1.
Figure 6:
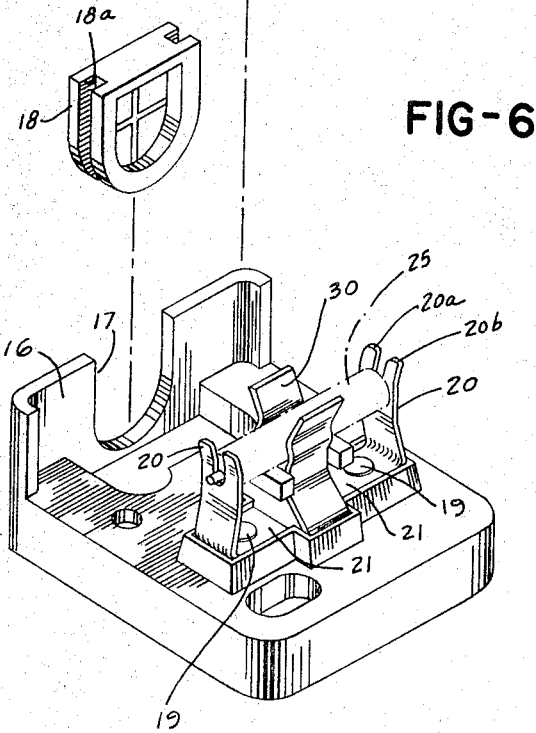

Base 12 is provided with a flanged portion 16 which includes a cut-out portion 17 (FIGS. 1, 2, 6) for receiving a grommet 18 through which the ground and signal or power lines are routed. The grommet is slotted as at 18a to overlap flange wall 17. The cover 11 includes a cut-out portion 11a for accommodating the grommet and the top portion thereof bears against the grommet by way of an enlarged section 11b.

Mounted on the base in aligned relationship and secured by suitable means such as rivets 19 are a pair of clips 20 (FIGS. 1, 3, 4, 6) each bifurcated to form spaced tines 20a and 20b. Each clip 20 also includes an integral inwardly directed extension 21, the distal region of which serves a purpose hereinafter described.

Associated with each clip 20 and connected thereto by means of the respective rivet 19 is a jumper strap 31

(FIGS. 1, 3–6) located in a resin packed recess 32 in the underside of the base. The strap and recess associated with each clip are routed obliquely to the region 32a, FIGURE 5. The base is bored in each of these regions to facilitate installation of a flat-headed threaded stud 22 serving as a wire terminal for the respective clip 20. Each stud passes through a hole in its respective strap and up through the base to present a threaded terminal on which a staked mounting nut 22a and wire clamping nut 22b with washers are threaded.

It may be seen that the above arrangement provides an electrical connection from each terminal 22 to its respective clip 20.

The clips 20 are aligned and biased inwardly to receive and resiliently clamp the over-voltage element 25. In the illustrated embodiment, this over-voltage element is of known construction, being for example, an AEI type 16 gas tube protector. A cartridge of this type comprises a gas filled housing having a pair of opposed, spaced electrodes each of which makes electrical contact with the respective cartridge end contacts 25a and 25b. By way of clips 20, jumpers 31 and wire terminals 22, the electrodes are each connected to one of the lines to be protected. In the presence of an excessive voltage across the lines, the gas between the electrodes is ionized thereby effectively shorting the end terminals 25A, 25B and connecting them to the case of the protector and to external ground as described below. The lines and equipment connected to these electrodes via the clips 20 are thus also short-circuited to thereby prevent the over-voltage condition from causing excessive current flow in the protected apparatus.

Resiliently clamping the center metallic sleeve on cartridge 25 and making electrical contact therewith is a clip 30 of generally U-shaped configuration having a pair of blades 30a and 30b formed in the upper sections of the legs of the U. These upper sections are offset inwardly with respect to the lower leg extremities. (See FIGURE 2.) The blades 30a and 30b are biased inwardly and include grooved sections for engaging and resiliently clamping the body of the over-voltage protector 25.

Figure 2:
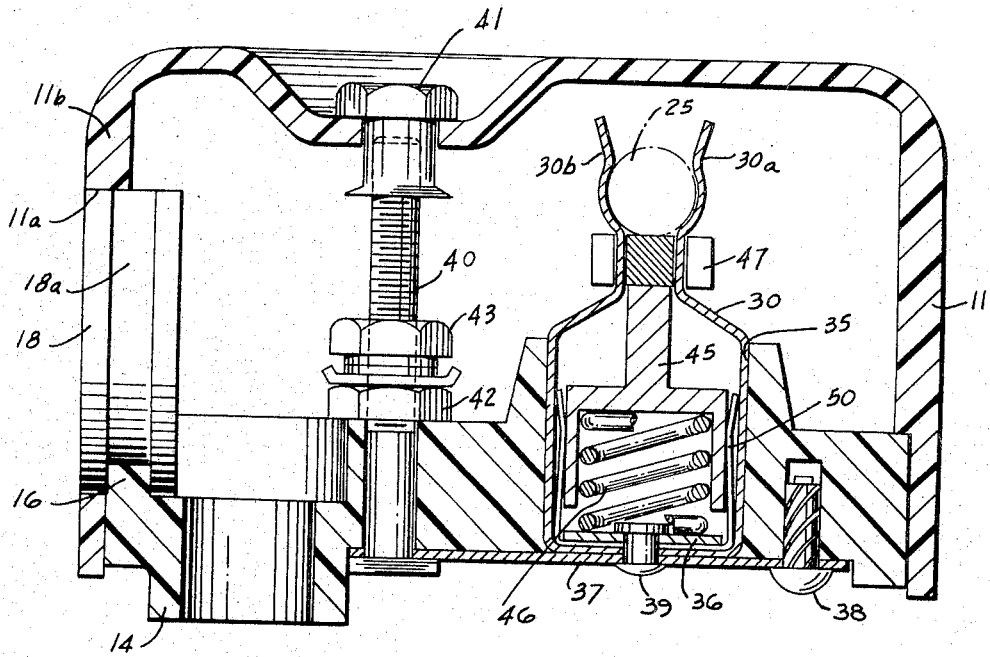
FIGURE 2 is an elevation cross-sectional view taken along the lines II—II of FIGURE 1.
Figure 3:
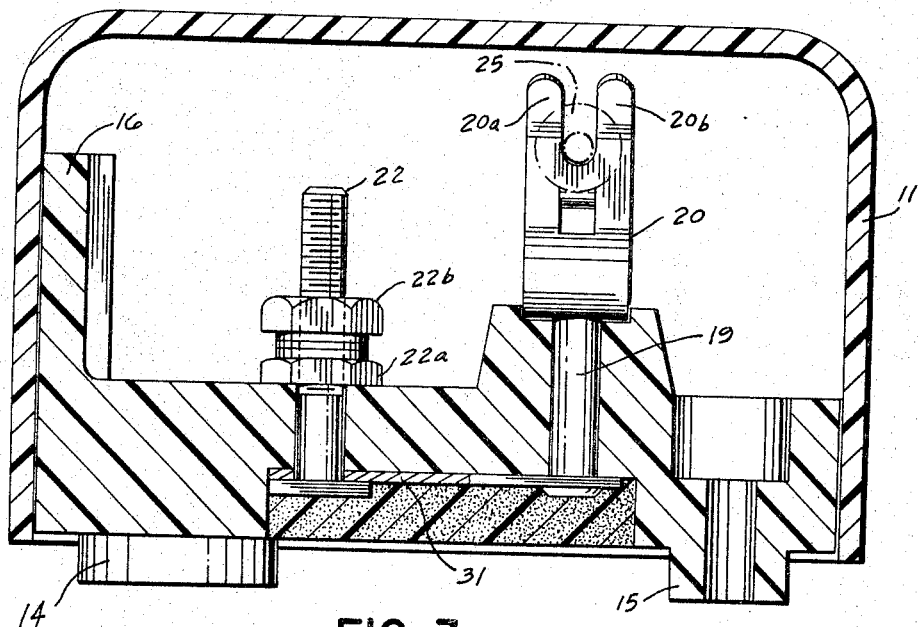
FIGURE 3 is an elevational cross-sectional view taken along the lines III—III of FIGURE 1.
Figure 4:
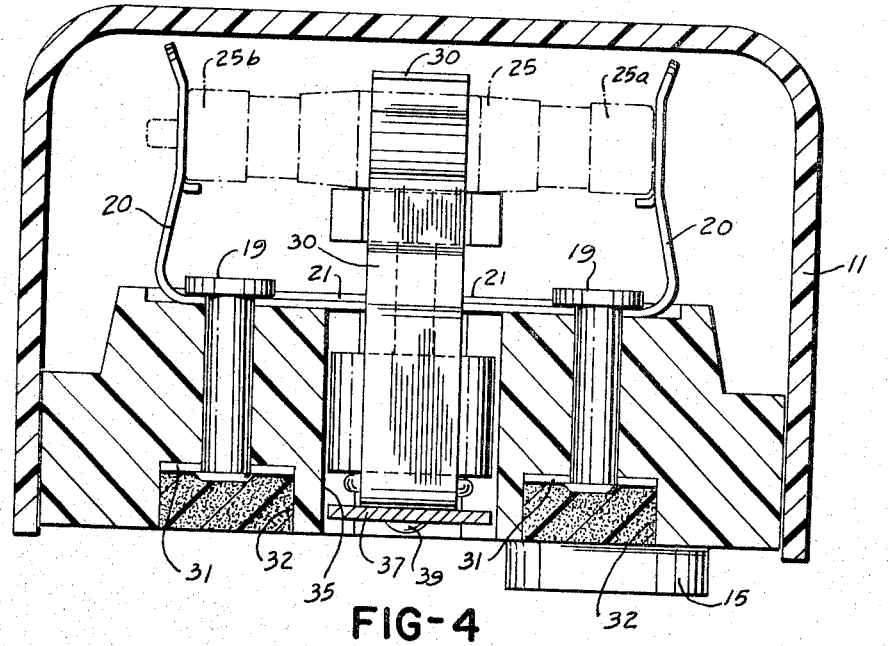
FIGURE 4 is an elevational cross-sectional view taken along the lines IV—IV of FIGURE 1.
Figure 5:
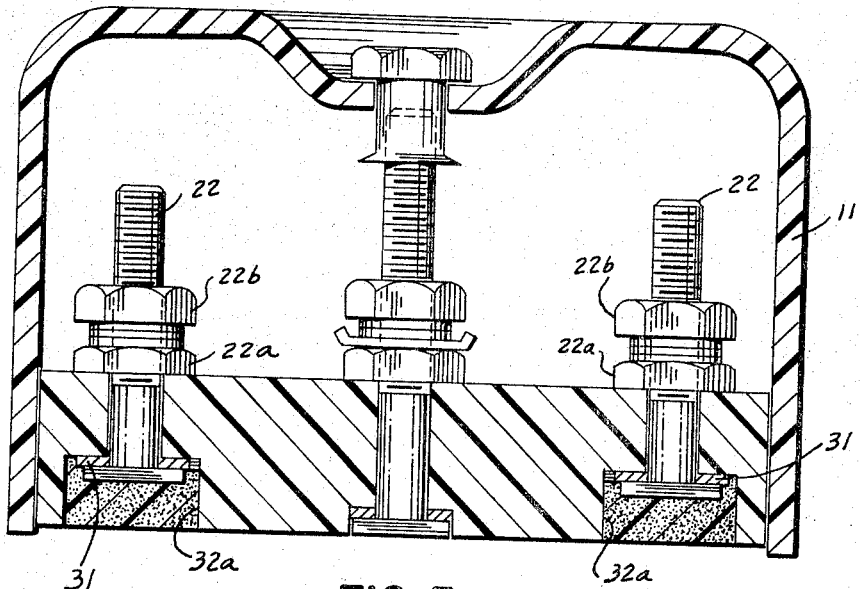
FIGURE 5 is an elevational cross-sectional view taken along the lines V—V of FIGURE 1.

The lower portion of clip 30 is seated in a recess 35 in base 10, see FIGURES 2 and 4, disposed in a recess in the underside of the base. One end of jumper 37 is secured to the base by means such as drive screw 38. At an intermediate portion of jumper 37 there is provided a rivet 39 which connects the jumper to clip 30 and to spring rest 36, as shown, for example, in FIGURE 2.

The other end of jumper 37 receives a threaded ground terminal 40 having a flat head in engagement with the jumper and a shaft which extends up through the base to a point adjacent the cover 11. At this point, the cover 11 is recessed and bored permitting a cover nut 41 to be inserted through the cover into engagement with the threaded ground stud. A staked nut 42 on shaft 40 serves to complete the securing of the terminal to the base, while an additional nut 43 and associated washers are provided for clamping the ground wire to terminal 40. When this is done, a ground connection is supplied to clip 30 and thence to the body of protector 25 by way of terminal 40 and jumper 37.

It may be seen from the above that the presence of an over-voltage condition sufficient to ionize discharge device 25 produces a low resistance path from the lines connected to terminals 22 to ground by way of the above-described connections.

In the case of a prolonged or excessive over-voltage condition, there is a possibility that gas tube 25 will fail thereby subjecting the equipment to be protected to serious damage. To eliminate this possibility and to provide additional reliability and safety, supplementary shorting and grounding means are provided as described below.

Disposed between the legs of clip 30 is a shorting member 45 which consists of a lower cylindrical portion slightly less in diameter than the spacing between the legs of clip 30 and integral upper cylindrical section of reduced diameter. Between the clip legs is a spring 46 which has one end bearing against spring rest 36 and the upper end located in a recess in the shorting member 45 and bearing upwardly against same to urge the shorting member in an upward direction. Interposed between the distal end of the shorting member 45 and the body of protector 25 is a fusible element 47 shaped generally in the form of an H with the cross-leg located between the legs of clip 30. Fusible member 47 is constrained to this general position by virtue of the outward flaring of the legs of clip 30 immediately above and below the fusible element. It may be seen that spring 46 urges shorting ram 45 into engagement with fusible element 47 and the latter is thereby urged into thermally conductive pressure engagement with the body of protector 25.

Fusible element 47 is composed of a suitable alloy for melting under predetermined over-voltage conditions while maintaining its shape during normal conditions notwithstanding the pressure generated resulting from spring 46.

It may be noted that the above-described shorting arrangement is electrically at ground potential by virtue of its connection with grounding jumper 37 and ground terminal 40. To insure a continuous acting and effective ground, a U-shaped wiper 50 is included in the assembly; its base is clamped between spring rest 36 and the base of spring 30 while its legs are resiliently pressed between the outer wall of shorting member 45 and the inner wall of the legs of clip 30.

In the position shown, the above assembly is electrically insulated from the end clips 20 which connect to the lines to be protected and to the electrodes of the over-voltage discharge tube 25. This may be seen, for example, by reference to FIGURE 4, it being apparent that the shorting member 45 does not make contact with the end clips in the position shown.

However, in the case of a sustained or excessive over-voltage condition which heats the over-voltage tube 25, the composition and disposition of fusible element 47 is such as to cause that element to fuse. In this event, spring 46 forces the shorting member 45 upwardly towards engagement with protector 25. This upward movement causes the enlarged cylindrical section of shorting member 45 to contact the resilient distal ends 21 (FIGURE 4) of spring clips 20, thus shorting these two clips and connecting them to ground potential. Hence, in the event of an over-voltage condition of such dimensions that discharge device 25 does not provide the required protection, the above-described supplementary shorting and grounding assembly shorts the protected lines to ground thereby protecting the terminal equipment.

It should be noted that the overhanging ends of the clips 20 are in a resilient configuration which insures positive and continued contact of these ends of the clips and the shorting ram 45 when supplementary shorting and grounding occur.

In the practice and study of the invention, modifications will undoubtedly occur to those skilled in the art. The invention is thus not limited to the specific mechanisms herein shown and described, but departures may be made therefrom within the scope of the accompanying claims without departing from the principles of the invention and without sacrificing its chief advantages.

What is claimed is:

1. Means for supplementing the protection provided by an over-voltage device having a gas filled container and a pair of spaced electrodes comprising a base, a pair of end clips, each having resilient engaging and contacting means at one end for contacting the electrodes of said over-voltage device and resilient contacting means at the other end for forming a pair of normally open contacts, a unitary resilient ground contactor and clamp means in direct contact with the container of said over-voltage device for grounding same and for resiliently clamping said over-voltage device in fixed position relative to said base, resiliently biased grounded shorting means for shorting said normally open contacts, fusible means interlocked with said ground contactor and clamp means against movement in all planes and in heat conductive pressure engagement with said container, said fusible means being disposed for maintaining said shorting means separate from said normally open contacts except when the heat generated by said container is sufficient to fuse said fusible means whereupon said shorting means engage said open contacts for shorting and grounding same.

2. Apparatus as defined in claim 1 in which said ground contactor and clamp means comprise a pair of spaced legs and in which said fusible means comprise an H-shaped structure, the central arm of which is located between said legs.

3. Apparatus according to claim 1 including a resilient contactor structure located between and in engagement with said shorting means and said ground contactor and clamp means for exerting compression on said shorting means to insure electrical contact from same to said ground contactor.

4. Apparatus as defined in claim 1 including a depression in said base having vertical walls for guiding said shorting means.

5. Apparatus according to claim 1 including a base cover, a ground terminal secured to said base and laterally offset from said over-voltage device, said ground contactor and clamp means being connected to said ground terminal, and wherein said ground terminal includes an upstanding shaft for securing said cover to said base.

6. Apparatus as defined in claim 1 in which said fusible means has a fusing characteristic for fusing when said over-voltage device reaches a predetermined excessive heat condition while maintaining its structural integrity at other times notwithstanding the effects of said pressure engagement.

References Cited

UNITED STATES PATENTS

| | | | |
|---|---|---|---|
| 1,799,689 | 4/1931 | Jones | 317—33 X |
| 1,874,407 | 8/1932 | Young | 317—33 |
| 1,974,956 | 9/1934 | Haffike | 316—24 |
| 2,581,308 | 1/1952 | Smith | 200—114 |
| 2,789,254 | 4/1957 | Bodle et al. | 317—33 |
| 2,941,108 | 6/1960 | Collins et al. | 313—216 |
| 3,072,816 | 1/1963 | Podzvwert | 313—216 |
| 3,093,430 | 6/1963 | Wiley | 316—24 |
| 3,141,996 | 7/1964 | McGrath | 317—13 |
| 3,146,378 | 8/1964 | Grenier | 317—13 |
| 3,298,027 | 11/1966 | Jones | 317—61 |

MILTON O. HIRSHFIELD, *Primary Examiner.*

R. V. LUPO, *Assistant Examiner.*